US010097777B2

(12) United States Patent
Melikian

(10) Patent No.: US 10,097,777 B2
(45) Date of Patent: Oct. 9, 2018

(54) DEPTH MAP FROM MULTI-FOCAL PLANE IMAGES

(71) Applicant: Recognition Robotics, Inc., Elyria, OH (US)

(72) Inventor: Simon Melikian, Westlake, OH (US)

(73) Assignee: Recognition Robotics, Inc., Elyria, OH (US)

( * ) Notice: Subject to any disclaimer, the term of this patent is extended or adjusted under 35 U.S.C. 154(b) by 318 days.

(21) Appl. No.: 15/173,011

(22) Filed: Jun. 3, 2016

(65) Prior Publication Data
US 2017/0353682 A1 Dec. 7, 2017

(51) Int. Cl.
| | | |
|---|---|---|
| *H04N 7/18* | (2006.01) | |
| *H04N 9/47* | (2006.01) | |
| *H04N 5/372* | (2011.01) | |
| *G06T 7/571* | (2017.01) | |
| *G02B 3/14* | (2006.01) | |
| *G06T 7/00* | (2017.01) | |
| *H04N 5/225* | (2006.01) | |
| *G06T 7/521* | (2017.01) | |

(52) U.S. Cl.
CPC ............... *H04N 5/372* (2013.01); *G02B 3/14* (2013.01); *G06T 7/0069* (2013.01); *G06T 7/571* (2017.01); *H04N 5/225* (2013.01); *G06T 7/521* (2017.01); *G06T 2207/10028* (2013.01); *G06T 2207/10148* (2013.01); *G06T 2207/20024* (2013.01)

(58) Field of Classification Search
None
See application file for complete search history.

(56) References Cited

U.S. PATENT DOCUMENTS

| | | | | |
|---|---|---|---|---|
| 5,705,803 | A | * | 1/1998 | Lisson ............... G02B 7/36 250/201.7 |
| 8,131,097 | B2 | | 3/2012 | Lelescu et al. |
| 8,340,422 | B2 | | 12/2012 | Boughorbel |
| 8,405,742 | B2 | | 3/2013 | Lim |
| 8,564,712 | B2 | | 10/2013 | Li |

(Continued)

OTHER PUBLICATIONS

Yi-Che Chen et al: "Depth map generation based on depth from focus", Electronic Devices, Systems and Applications (ICEDSA), 2010 International Conference on, IEEE, Piscataway, NJ, USA Apr. 11, 2010.

(Continued)

*Primary Examiner* — Talha M Nawaz
(74) *Attorney, Agent, or Firm* — Rankin, Hill & Clark LLP

(57) ABSTRACT

A system for generating a depth map for an object in a three-dimensional (3D) scene includes an image capture sensor and a processor. The image capture sensor is configured to capture a plurality of images of the object at a plurality of different focal planes. The processor is configured to calculate a plurality of variance values for a plurality of image locations for each image captured by the image capture sensor. The processor is also configured to determine a peak variance value for the plurality of image locations based on the calculated variance values associated with the same image location for each of the plurality of images of the object at the plurality of different focal planes. The processor is also configured to generate the depth map for the object based on the determined peak variance value for each image location and the plurality of different focal planes.

20 Claims, 5 Drawing Sheets

(56) References Cited

U.S. PATENT DOCUMENTS

| | | |
|---|---|---|
| 9,123,118 B2 | 9/2015 | Ciurea et al. |
| 9,208,570 B2 | 12/2015 | Ali et al. |
| 9,292,926 B1 | 3/2016 | Tang et al. |
| 9,300,946 B2 | 3/2016 | Do et al. |
| 9,307,221 B1 | 4/2016 | Tang et al. |
| 2002/0181762 A1 | 12/2002 | Silber |
| 2013/0070060 A1 | 3/2013 | Chatterjee |
| 2014/0002674 A1* | 1/2014 | Duparre ............... H04N 5/2254 348/187 |
| 2015/0109513 A1 | 4/2015 | Nayar |
| 2015/0146994 A1 | 5/2015 | Arnison |

OTHER PUBLICATIONS

Bastien, Billiot et al.; "3d Image Acquisition System Based on Shape from Focus Technique", Sensors, vol. 13, No. 4, Apr. 15, 2013.
Paolo Favaro: "Depth from focus/defocus", Jan. 25, 2002, XP055397952, http://homepages.inf.ed.ac.uk.
European Search Report filed in EP 17173832 dated Aug. 21, 2017.

\* cited by examiner

US 10,097,777 B2

DEPTH MAP FROM MULTI-FOCAL PLANE IMAGES

BACKGROUND

In three-dimensional (3D) computer graphics, a depth map is an image that includes information relating to a distance of one or more surfaces of an object from a given viewpoint, such as from an observer. Often, multiple cameras are required in order to produce these depth maps. For example, a depth camera, time of flight camera, and a color camera may be used in combination to determine a model of an object. Also, laser camera triangulation is also used to generate depth map.

These known methods of generating a depth map require multiple cameras or a structured light source. There are instances where the use of multiple cameras or a structured light source is not practical or preferred.

BRIEF DESCRIPTION

In view of the foregoing, a system for generating a depth map for an object in a three-dimensional (3D) scene includes an image capture sensor and a processor. The image capture sensor is configured to capture a plurality of images of the object at a plurality of different focal planes. The processor is configured to calculate a plurality of variance values for a plurality of image locations for each image captured by the image capture sensor. The processor is also configured to determine a peak variance value for the plurality of image locations based on the calculated variance values associated with the same image location for each of the plurality of images of the object at the plurality of different focal planes. The processor is also configured to generate the depth map for the object based on the determined peak variance value for each image location and the plurality of different focal planes.

A method for generating a depth map for an object in a three-dimensional (3D) scene may include capturing, with an image capture sensor, a plurality of images of the object at a plurality of different focal planes. Each image of the plurality of images is made up of a matrix of pixels. The method may further include calculating a plurality of variance values for a plurality of image locations for each image of the plurality of images of the object at the plurality of different focal planes. The method may also include determining a peak variance value for each image location of the plurality of image locations based on the calculated variance values associated with the same image location in each image for the plurality of images of the object at the different focal planes. The method further includes determining a depth value for each image location of the plurality of image locations based on the determined peak variance value for each image location of the plurality of image locations, and generating the depth map for the object based on the determined depth value for each image location of the plurality of image locations.

DETAILED DESCRIPTION

Figure 1:
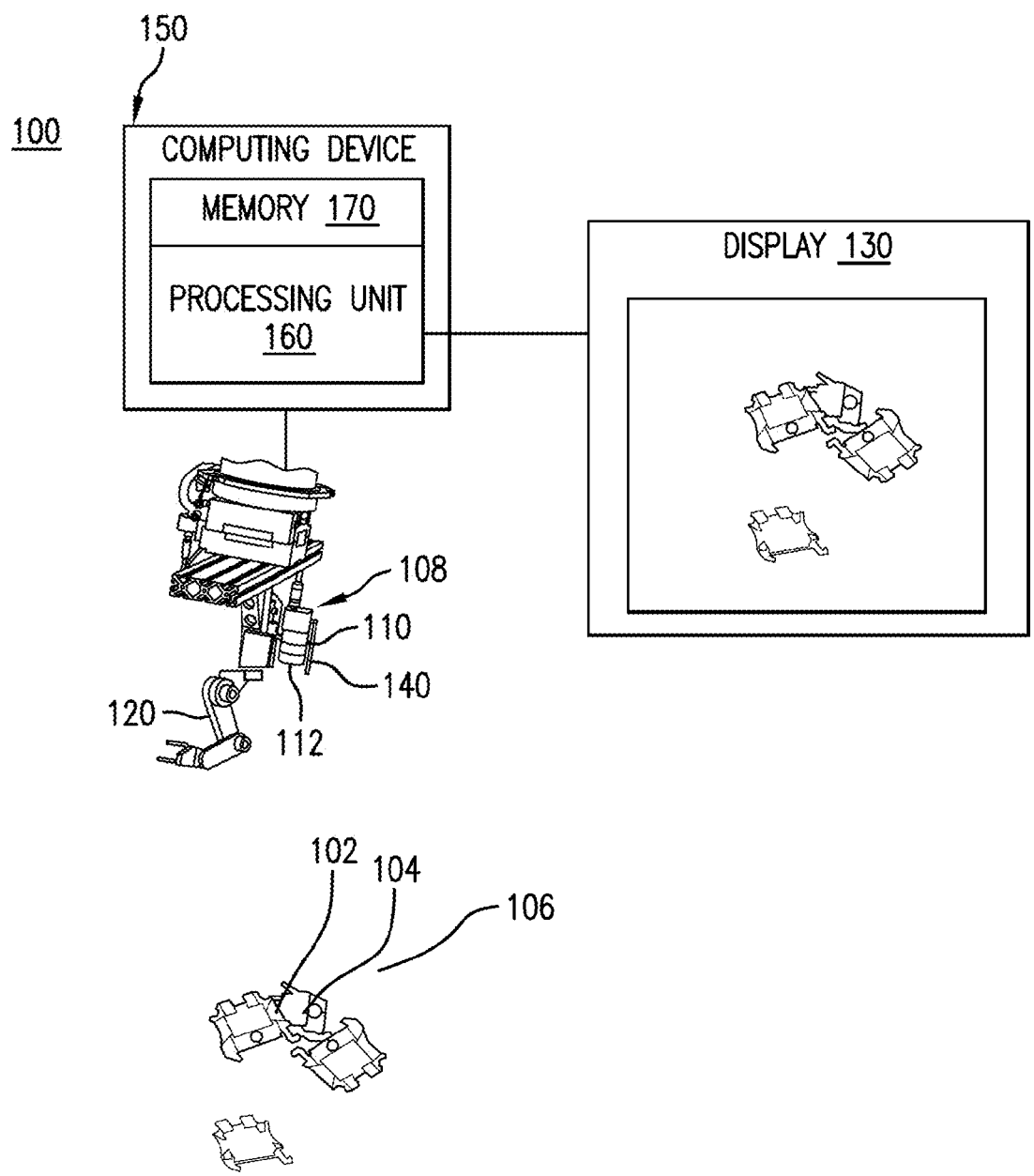
FIG. 1 is an illustration of a system for generating a depth map for an object from multi-focal plane images of the object.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

FIG. 1 is an example of a system 100 for generating a depth map from multi-focal plane images. The system 100 may include a camera 108 including an image capture sensor 110 and a lens 112. The system 100 may further include a robotic arm 120, a display 130, a projector 140, and a computing device 150 having a processor or processing unit 160 and a memory 170.

The image capture sensor 110 is configured to capture a plurality of images associated with one or more different focal planes (in an estimated range of where an object will be), thereby gathering sets of multi-focal plane images of an object. The image capture sensor 110 can be a CCD array and the lens 112 can be associated with the image capture sensor 110 to change the focal plane. The lens 112 can be a liquid lens, which has very fast response time to an applied voltage to change the focal distance of the lens 112.

The system 100 is useful to generate a depth map for an object in a three-dimensional scene. As seen in FIG. 1, objects 102, 104, and 106 are in field of view of the image capture sensor 110. For this example, the image capture sensor 110 may capture or take a plurality of images of the object 102 at a plurality of different focal planes, thereby capturing different 'slices' of images at different focal distances. In this way, different locations on the surface of the object 102 may appear in focus in different images. Each image of the multi-focal plane images or plurality of images is associated with the focal plane or focal distance from the image capture sensor 110 to the corresponding focal plane. This information along with a calculated variance value, which is explained below, may be utilized to facilitate depth map generation at a later stage. Work can be performed on the object 102 based on the depth map that is generated. For example, a pick or grasping location can be determined based on the depth map, however, the depth map can be useful in other environments.

Figure 2:
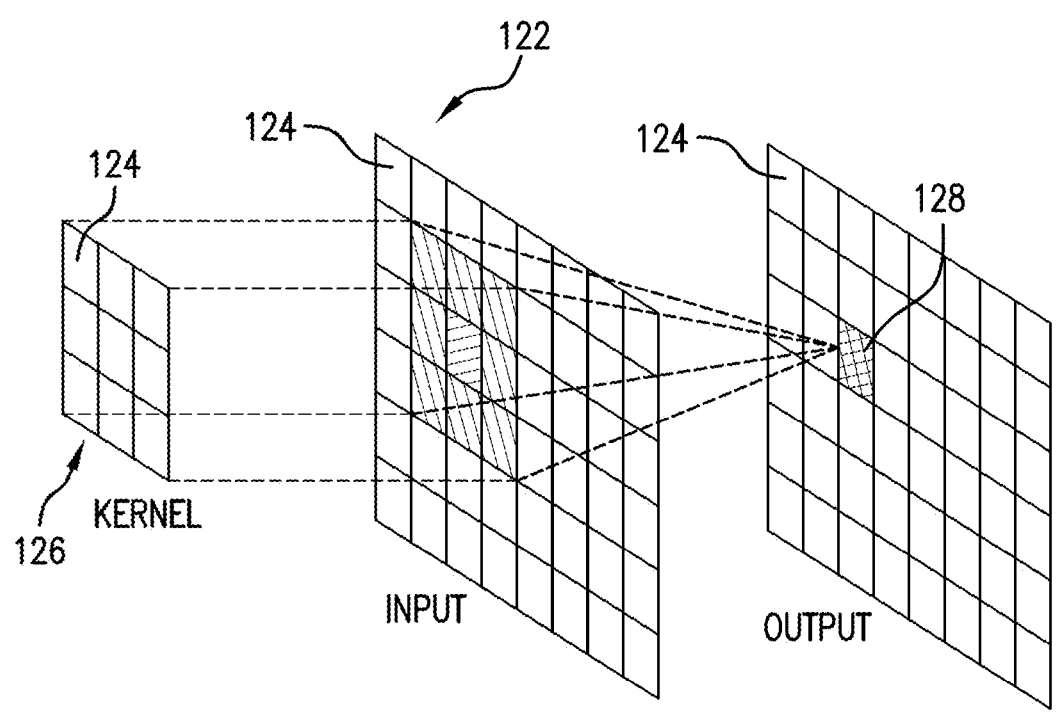
FIG. 2 depicts an example of an image made up of a plurality of pixels and determining a variance value for an image location.

Each image includes a matrix of pixels and may be broken down or divided into different, arbitrary regions, such as image locations, which can be an individual pixel at a particular location in a coordinate system, and kernels, which include a plurality of pixels. FIG. 2 depicts an image 122, which is made up from a plurality of pixels 124, in which a kernel 126 of pixels 124 is used to generate a variance value of a particular image location 128. For example, the kernel 126 may be a 3×3 square of pixels 124. The particular image location 128 for which the variance value is being determined can be the center of the kernel 126. The computing device 150 or processing unit 160 thereof may determine a kernel size based on computing power, hardware, or memory 170 available in the computing device 150. Other factors may include an estimated focal plane range for the object and the texture or contrast on the surface of the object in the three-dimensional scene. The variance value can be computed using a convolution style variance computation method.

Figure 3:
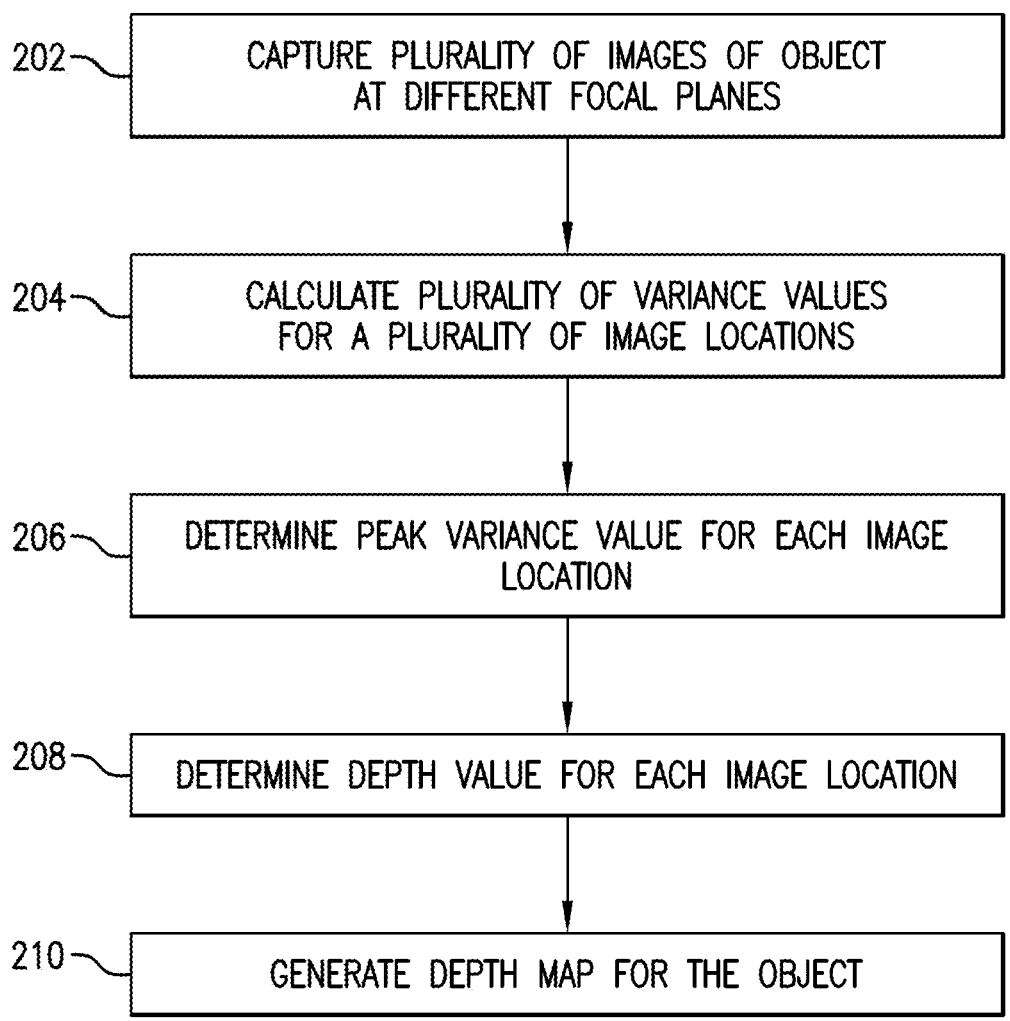
FIG. 3 is a flow diagram of a method for generating a depth map.
Figure 4:
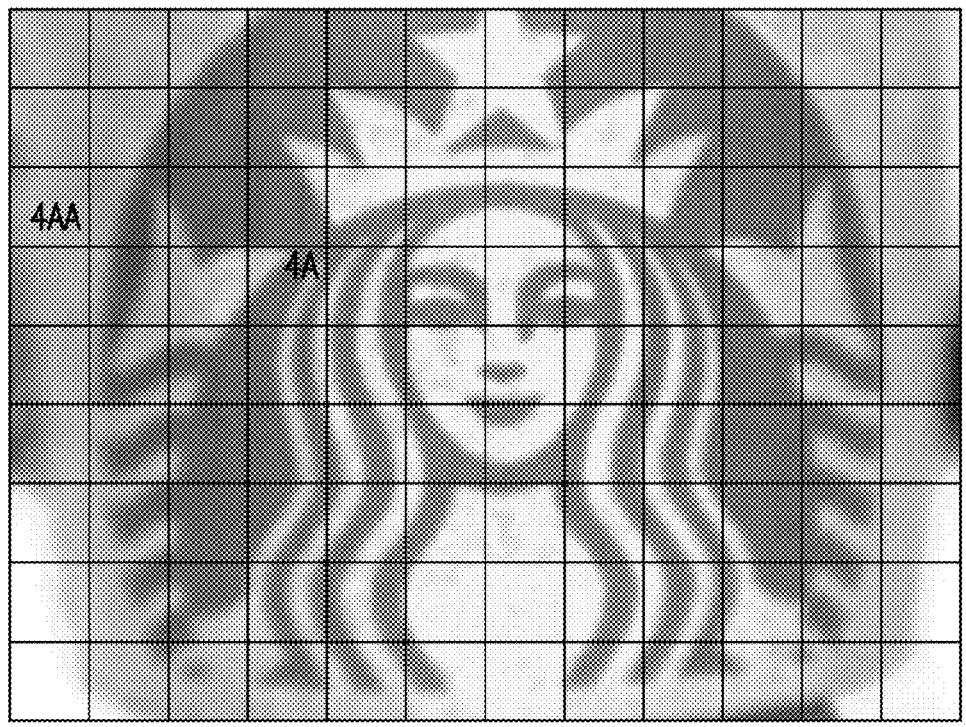
FIG. 4 is an image of an object from a series of multi-focal plane images of the object.
Figure 5:
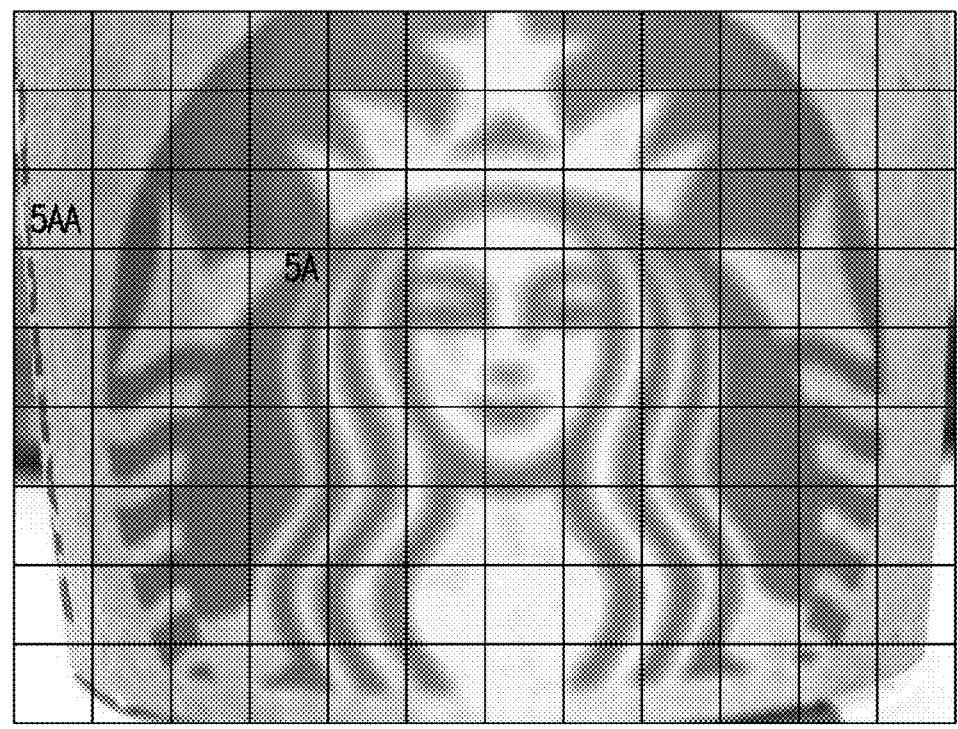
FIG. 5 is another image of the object from the series of multi-focal plane images of the object.

FIG. 3 is an illustration of an example flow diagram of a method 200 for generating a depth map from multi-focal plane images. The method 200 includes, at 202, capturing a plurality of images of an object at a plurality of different focal planes. Examples of such images are shown in FIG. 4 and FIG. 5. FIG. 4 is an image of an object taken at a first focal distance from the image capture sensor 110 of FIG. 1. Similar to FIG. 4, FIG. 5 is an image of an object taken at a second focal distance. Both images have grids overlaid on the image to facilitate locating particular image locations that will be described in more detail below, however, these image locations were arbitrarily chosen to explain particular concepts of the invention. Image locations '4A' and '4AA' will be described in greater detail and correspond to '5A' and '5AA' of FIG. 5.

At 204, a plurality of variance values may be calculated for a plurality of image locations. The processor or processing unit 160 of FIG. 1 may calculate the variance values for one or more or all of the image locations, which can be as small as an individual pixel at a particular location in a coordinate system common to all images captured by the image capture sensor 110. As discussed above, the image can be divided into a plurality of kernels, which for example may be a 3×3 square of pixels. The variance value for each image location can be computed using a convolution style variance computation method or other known method for computing variance. FIG. 4 and FIG. 5 only show two different images in two different focal planes, however, if the image capture sensor 110 captures 20 different images at 20 different focal distances or focal planes, for example, each one of those 20 images may be divided into image locations with the same coordinate system (e.g., similar to the grid overlaying FIGS. 4 and 5) and the processing unit 160 may calculate corresponding variance values for each one of the corresponding image locations in each one of the 20 images. Thus, the processing unit 160 may calculate a plurality of variance values for each image location for each image of the plurality of images.

Figure 6:
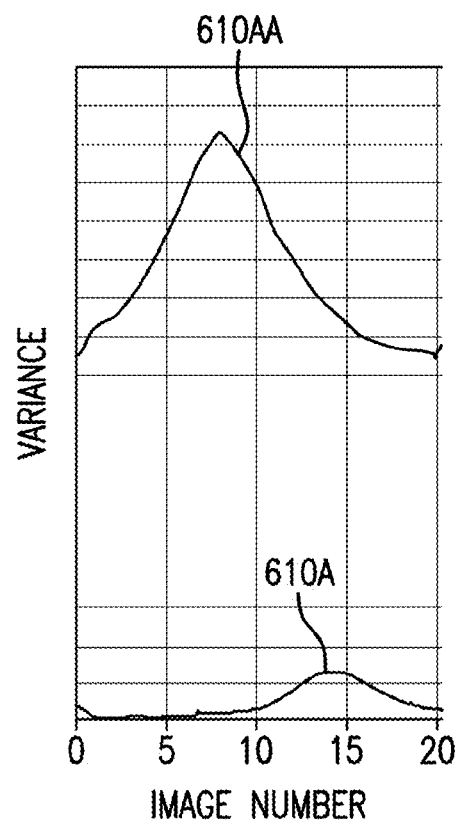
FIG. 6 is a graph of variance values associated particular image locations.

At 206, a peak variance value is determined for each image location based on variance values associated with the same image location. The processing unit 160 is configured to determine a peak variance value for each image location using a set of variance values from all of the images captured which are associated with that same image location. For example, with reference to FIGS. 4, 5 and 6, the variance value for each image is shown in the graph in FIG. 6 with curve 610A corresponding to image location A, which is denoted as 4A in FIG. 4 and 5A in FIG. 5, and curve 610AA corresponding to image location AA, which is denoted as 4AA in FIG. 4 and 5AA in FIG. 5. The x-axis in FIG. 6 is the image number, where each image has a different focal plane, and the y-axis is the variance value for a particular image location. As shown in FIG. 6, 20 different images with 20 different focal planes were captured. A fewer or greater number of images at different focal planes can be captured. The variance value for each image location can be plotted for each image. The processing unit 160 determines the peak variance value by interpolating the set of variance values associated with the same grid location across the different images at different focal planes. Here, the processing unit 160 can be configured to plot one or more of the variance values against an image number, similarly to the graphs of FIG. 6. Further, the processing unit 160 may infer or interpolate peaks of these variance graphs or curve fit to determine the peak variance value using different statistical or mathematical techniques.

The variance values among the multi-focal plane images may be utilized to determine which image (and corresponding focal plane) is most in focus for a given image location because the greater the variance (e.g., or contrast associated with pixels within a kernel), the more likely that the respective image location is in focus. This can be seen when comparing FIG. 4 to FIG. 5 where image location A, which is denoted as 4A in FIG. 4 and 5A in FIG. 5, is more in focus in FIG. 4 than image location AA, which is denoted as 4AA in FIG. 4 and 5AA in FIG. 5, and vice versa.

At 208, a depth value is determined for each image location. The focal plane distance of each image captured by the image capture sensor 110 is known or can be determined. For example, the voltage supplied to the lens 112 can be varied and controlled so that the focal plane for image number 1 in FIG. 6 is 110 mm from the image capture sensor 110, the focal plane for image number 2 is 120 mm, the focal plane for image number 3 is 130 mm, etc. The change in distance between the images can be changed and need not be constant. Using similar methods of inference and interpolation as described above for determining the peak variance value, a depth value can be determined for each image location. For instance, for the image location A, which is denoted as 4A in FIG. 4 and 5A in FIG. 5, the peak variance is shown between image number 7, which may have an image focal plane of 170 mm from the image capture sensor 110, and image number 8, which may have an image focal plane of 180 mm. Likewise, for the image location AA, which is denoted as 4AA in FIG. 4 and 5AA in FIG. 5, the peak variance is shown between image number 18, which may have an image focal plane of 280 mm from the image capture sensor 110, and image number 19, which may have an image focal plane of 290 mm. In this particular example, using methods of inference and interpolation as described above for determining the peak variance value, the depth value for location A could be determined as 173 mm, which is between 170 mm and 180 mm, and the depth value for location AA could be determined as 287 mm.

Figure 7:
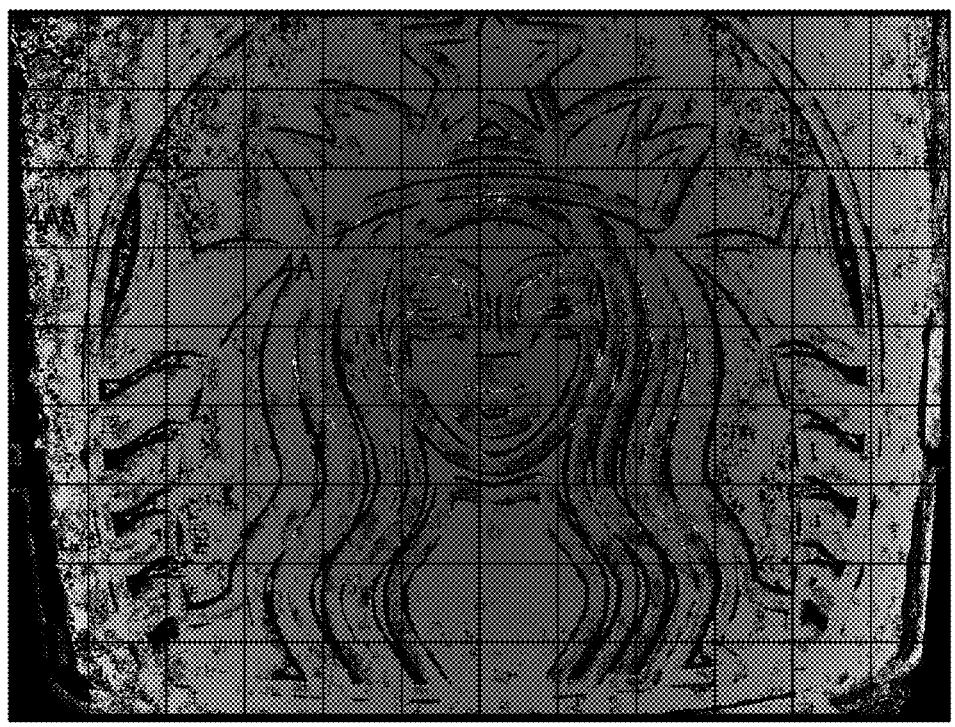
FIG. 7 is an example graphical representation of a depth map of the object shown in FIGS. 4 and 5.

At 210, the depth map may be generated based on the peak variance value and the depth value for each image location. In this way, depth map values for the depth map may be 'stitched' together from the depth values associated with the image locations across a plurality of different images associated with different focal planes. FIG. 7 is an illustration of an example graphical representation of a depth map of the object shown in FIGS. 5 and 6. The depth map is generated based on the maximum or peak variance value of each image location. Because the variance is likely greatest when an image is in focus, each location on the depth map can be assembled or generated based on the peak variance value from a set of variance values across the multi-focal images at that image location. Further, because each image from the multi-focal images collected is associated with a known focal plane or a determined (e.g., interpolated) focal distance from the image capture sensor 110, the depth map may include a depth map value indicative of the focal distance or focal plane for each image location. In other words, generating the depth map may include assigning a depth map value indicative of a distance from a surface of the object to the image capture sensor, for each image location. The depth map value may be a grayscale value or a color value. In one or more embodiments, the depth map may be scaled (e.g., from 0-100 or 0-255).

The processing unit 160 may apply one or more filters to one or more of the multi-focal images prior to calculation of the variance values. For example, a Laplacian filter of a Gaussian filter may be applied. Other filters, such as first derivative filters, could also be employed. In this way, image processing functions may be applied on raw 'slices' or images prior to computing or calculating the variance, thereby enabling less noisy depth measurements to be provided when the peak or maximum variance values are found. This is because variance values may be affected by light variation. Therefore, application of such filters may result in more stable depth measurements.

Finding the peak variance value among the multi-focal plane images enables the processing unit 160 to generate the depth map because the image associated with the peak variance value for the particular image location is associated with a focal plane or focal distance from the image capture sensor 110. Using this focal distance, the processing unit 160 may populate a corresponding section (e.g., an image location on a coordinate system similar to the grids shown in FIGS. 5 and 6) of a table, chart, or map with the focal distance taken from the image associated with the peak variance value for that image location (e.g., assigned as a depth map value to that grid location). Further, the depth map may be scaled accordingly, such as from (0-100) or from (0-255).

It will be appreciated that any number of multi-focal images may be captured and analyzed using the techniques described herein. In any event, the processing unit 160 may determine the peak variance values accordingly, by determining a peak variance value for each image location based on a set of variance values associated with the same image location across the plurality of images at the different focal planes. The display 130 may render a visualization of the object in the three-dimensional scene based on the depth map for the object. For example, the display may render the depth map with different shades or degrees of color, brightness, contrast, etc. based on the depth value associated with a particular image location.

The projector 140 may project a pattern onto an object to facilitate image processing, such as when an object is texture-less or when the variance is below a threshold value across portions of one or more of the images. That is, when an object has no texture, a pattern can be projected by the projector 140 while the image capture sensor 110 captures the plurality of images of the object 102 and the depth map may be generated accordingly, with 'help' from the texture projected onto the object 102.

In one or more embodiments, the robotic arm 120 may grasp the object 102 based on the generated depth map for that object.

Although the subject matter has been described in language specific to structural features or methodological acts, it is to be understood that the subject matter of the appended claims is not necessarily limited to the specific features or acts described above. Rather, the specific features and acts described above are disclosed as example embodiments. Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for generating a depth map for an object in a three-dimensional (3D) scene, comprising:
   an image capture sensor configured to capture a plurality of images of the object at a plurality of different focal planes;
   a liquid lens associated with the image capture sensor for changing the focal plane for each image captured by the image capture sensor; and
   a processor configured to:
      calculate a plurality of variance values for a plurality of image locations for each image captured by the image capture sensor;
      determine a peak variance value for the plurality of image locations based on the calculated variance values associated with the same image location for each of the plurality of images of the object at the plurality of different focal planes;
      generate the depth map for the object based on the determined peak variance value for each image location and the plurality of different focal planes; and
      determine the focal plane for a respective image of the plurality of images of the object based on a voltage being applied to the liquid lens and associate the determined focal plane for the respective image with the calculated variance values for the respective image.

2. The system of claim 1, wherein the image capture sensor captures the plurality of images based on an estimated focal plane range.

3. The system of claim 1, further comprising a liquid lens associated with the image capture sensor for changing the focal plane for each image captured by the image capture sensor.

4. The system of claim 3, wherein the processor is configured to determine the focal plane for a respective image of the plurality of images of the object based on a voltage being applied to the liquid lens and to associate the determined focal plane for the respective image with the calculated variance values for the respective image.

5. The system of claim 1, wherein the processor is configured to determine the peak variance value for each image location by interpolating the calculated variance values associated with the same image location for each image of the plurality of images of the object at the plurality of different focal planes.

6. The system of claim 1, wherein the processor is configured to determine a depth value for each image location based on interpolating the calculated variance values associated with the same image location for each image of the plurality of images of the object at the plurality of different focal planes.

7. The system of claim 6, wherein each image location corresponds to an individual pixel at a location in a coordinate system for each image of the plurality of images of the object at the plurality of different focal planes.

8. The system of claim 1, comprising a projector configured to project a pattern on the object while the image capture sensor captures the plurality of images of the object.

9. The system of claim 1, wherein the processor applies a filter to each image of the plurality of images prior to calculating the plurality of variance values.

10. The system of claim 9, wherein the filter is a Laplacian filter of a Gaussian filter.

11. A method for generating a depth map for an object in a three-dimensional (3D) scene, comprising:

capturing, with an image capture sensor, a plurality of images of the object at a plurality of different focal planes, each image of the plurality of images comprising a matrix of pixels;

calculating a plurality of variance values for a plurality of image locations for each image of the plurality of images of the object at the plurality of different focal planes;

determining a peak variance value for each image location of the plurality of image locations based on the calculated variance values associated with the same image location in each image for the plurality of images of the object at the different focal planes;

determining a depth value for each image location of the plurality of image locations based on the determined peak variance value for each image location of the plurality of image locations;

generating the depth map for the object based on the determined depth value for each image location of the plurality of image locations;

changing the focal plane of a liquid lens associated with the image capture sensor for each image captured by the image capture sensor; and determining the focal plane for a respective image of the plurality of images of the object based on a voltage being applied to the liquid lens.

12. The method of claim 1, further comprising changing the focal plane of a liquid lens associated with the image capture sensor for each image captured by the image capture sensor.

13. The method of claim 12, further comprising determining the focal plane for a respective image of the plurality of images of the object based on a voltage being applied to the liquid lens.

14. The method of claim 11, determining the peak variance value for each image location by interpolating the calculated variance values associated with the same image location for each image of the plurality of images of the object at the plurality of different focal planes.

15. The method of claim 11, determining the depth value for each image location based on interpolating the calculated variance values associated with the same image location for each image of the plurality of images of the object at the plurality of different focal planes.

16. The method of claim 11, wherein each image location corresponds to an individual pixel at a location in a coordinate system for each image of the plurality of images of the object at the plurality of different focal planes.

17. The method of claim 11, further comprising projecting, with a projector, a pattern on the object while capturing the plurality of images of the object.

18. The method of claim 11, further comprising applying a filter to each image of the plurality of images prior to calculating the plurality of variance values.

19. The method of claim 18, wherein the filter is a Laplacian filter of a Gaussian filter.

20. The method of claim 11, wherein generating the depth map includes assigning a depth map value based on the depth value, wherein the depth map value is indicative of a distance from a surface of the object to the image capture sensor for each image location.

* * * * *